Patented Sept. 28, 1926.

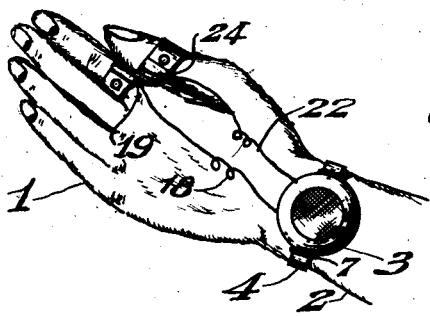
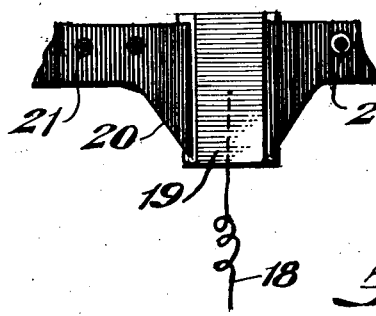
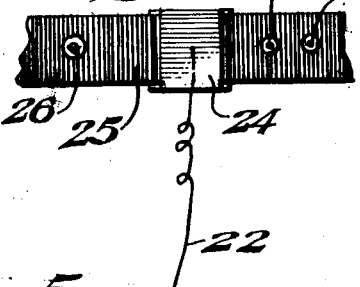
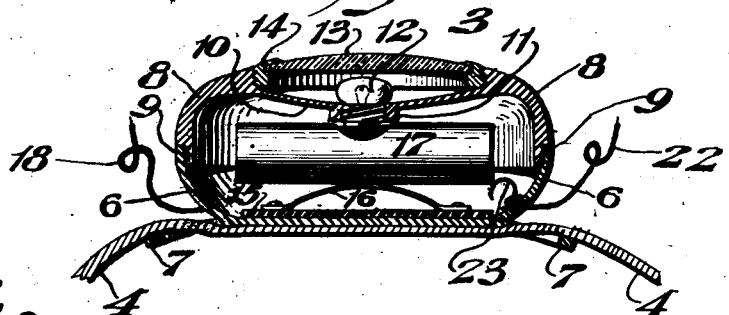
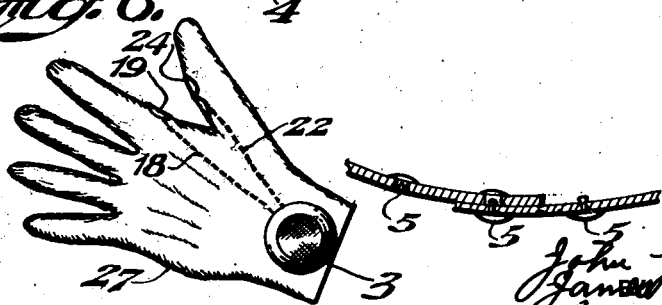

1,601,539

UNITED STATES PATENT OFFICE.

JOHN G. PATTON, OF PHILADELPHIA, AND JAMES T. WILSON, OF MERION, PENNSYLVANIA.

DIRECTION AND DANGER SIGNAL.

Application filed October 11, 1920. Serial No. 416,317.

Our present invention comprehends a novel construction and arrangement of a direction and danger signal which, although not limited to such use, is especially adapted to be employed by the driver of a motor driven vehicle.

It further comprehends a novel construction of a direction and danger signal which can be readily attached to the wrist of the driver and is constructed in such a manner that when the driver extends his arm it indicates to a vehicle in rear of him that the driver ahead is about to turn or slow down.

It further comprehends a novel construction and arrangement of a flash light having means to secure it to the wrist of the operator and provided with contacts to effect the closing of the electric circuit when the driver extends his arm; while, when the driver has hold of the steering wheel, the contacts are separated and the electric circuit is open.

It further comprehends a novel construction and arrangement of a flash light carrying glove.

Other novel features of construction and advantage will hereinafter appear in the detailed description of the invention.

For the purpose of illustrating our invention, we have shown in the accompanying drawings, typical embodiments of it which are at present preferred by us since they will give in practice satisfactory and reliable results. It is, however, to be understood that the various instrumentalities of which our invention consists can be variously arranged and organized, and the invention is not limited to the exact arrangement and organization of these instrumentalities as herein set forth.

Figure 1 represents in perspective a direction and danger signal, embodying our invention, in use, the parts being shown in the position they assume when the circuit is closed.

Figure 2 represents in perspective a direction and danger signal, embodying our invention, in use, the parts being shown in the position they assume when the circuit is open.

Figures 3 and 4 represent respectively in plan the circuit closing members.

Figure 5 represents, in sectional elevation, the flash light and certain of its adjuncts.

Figure 6 represents in perspective a flashlight carrying glove embodying our invention.

Similar numerals of reference indicate corresponding parts.

Referring to the drawings:—

1 designates the hand of the driver or operator, and 2 his wrist, to which latter the flash light 3 is attached by means of a strap 4 which is secured in adjusted position by means of one or more snap fasteners 5. The flash light is provided with a bottom casing section or body portion 6 having apertured ears 7 through which the strap passes.

8 designates the top casing section which may be in threaded engagement with the bottom casing section as indicated at 9. The casing section 8 is provided with a reflector 10 and a threaded socket 11 to receive the bulb 12. The lens 13, which is preferably colored red, is secured in position by a flanged ring 14 in threaded engagement with the top casing section. The bottom casing section is provided with a plate 15 of insulating material which carries a spring 16 which retains the terminal of a battery 17 in contact with the central contact point of the bulb 12. The insulating character of the plate 15 serves to maintain an open circuit between the filament of the bulb 12, the metallic casing 8, and the battery 17; which circuit may thus be closed at will by the contacts 19 and 24 through the wires 18 and 22 respectively. A conductor 18 leads from the casing to a contact 19 of a contact carrying member 20 in the form of a strap having one or more snap fasteners 21 in order that it may be adjustably connected to the finger of the user.

A conductor 22 leads from the terminal 23 in electrical connection with the battery to a contact 24 of a contact carrying member 25 in the form of a strap having one or more snap fasteners 26 in order that it can be adjustably connected to a thumb of the operator.

It will now be evident that when the driver extends his arm and closes down his thumb, the contacts 19 and 24 will engage each other, the circuit will be closed and the flash light will throw a red light to indicate to anyone in rear of him that he is going to slow down or change the direction.

It will be apparent that the construction seen in Figure 6 is similar to that already described, except that the securing straps are omitted and the entire device is carried by a glove 27, the relative position of the flash light and the contacts being the same in each embodiment of the invention, as herein shown.

The act of grasping the steering wheel of the motor vehicle will separate the contacts and the circuit will remain open, as is apparent.

It is natural for a person when extending his arm to close down his thumb and we therefore prefer to have one of the contacts carried by the thumb of the operator or his glove, but it will be apparent that in the broad spirit of our invention these contacts may have any desired location on the hand, so that they can be operated or controlled by the hand of the operator.

It will now be apparent that we have devised a novel and useful direction and danger signal which embodies the features of advantage enumerated as desirable in the statement of the invention and the above description, and while we have, in the present instance shown and described a preferred embodiment thereof which will give in practice satisfactory and reliable results, it is to be understood that such embodiment is susceptible of modification in various particulars.

Having thus described our invention, what we claim as new and desire to secure by Letters Patent, is:—

A signaling device comprising a two part metallic casing comprising a circular base and a circular cap, said base having screw threaded relation with said cap, the latter having a screw threaded opening in its top concentric with said cap, a flanged ring having a colored lens therein, said ring having screw threaded relation with said cap, said ring and lens having concentric relation with said cap, a convexed reflector having a lamp socket, said reflector being carried by the upper part of said cap, a lamp fitted to said socket, said lamp and reflector being arranged in a plane below said lens, a battery within said casing one pole being in contact with the center contact of said lamp, a plate of insulating material carried by the base of the casing, a spring on said plate for maintaining said battery in contact with said lamp contact, means for attaching said base to the wrist of the user, and spring contact means carried by and insulated from said base and engaging the other pole of the battery, wires connected to said casing and to said spring contact means and to contact means under control of the user.

JOHN G. PATTON.
JAMES T. WILSON.